United States Patent [19]

Pitts

[11] Patent Number: 4,891,130
[45] Date of Patent: Jan. 2, 1990

[54] PROCESS FOR REMOVING METALS FROM ALUMINOSILICATE MATERIALS

[75] Inventor: Frank Pitts, Magalas, France

[73] Assignee: Engelhard Corporation, Edison, N.J.

[21] Appl. No.: 883,004

[22] Filed: Jul. 7, 1986

Related U.S. Application Data

[63] Continuation of Ser. No. 628,695, Jul. 6, 1984, abandoned.

[51] Int. Cl.⁴ .................. C10G 25/05; C10G 25/12; C10G 31/00; B01J 29/38
[52] U.S. Cl. ......................... 208/305; 208/91; 208/251 R; 208/299; 423/62; 423/63; 423/68; 423/138; 423/139; 423/150; 502/12; 502/25; 502/26; 502/27; 502/516
[58] Field of Search ............ 502/576, 25, 27, 28, 502/20, 22, 12, 3; 423/62, 63, 68, 138, 139, 150; 75/111, 119, 121, 101 R; 208/91, 251 R, 299, 305

[56] References Cited

U.S. PATENT DOCUMENTS

| | | | |
|---|---|---|---|
| 2,668,798 | 2/1954 | Plank | 502/27 |
| 3,203,786 | 8/1965 | Wesolowski | 75/119 |
| 3,409,541 | 11/1963 | Flanders et al. | 208/120 |
| 3,522,001 | 7/1970 | Vesely | 75/113 |
| 3,773,890 | 11/1973 | Fox et al. | 423/62 |
| 3,894,927 | 7/1975 | Kane | 75/119 |
| 4,087,510 | 5/1978 | Steenken | 423/62 |
| 4,126,663 | 11/1978 | Pitts | 423/63 |
| 4,145,397 | 3/1979 | Toida et al. | 423/63 |
| 4,263,128 | 4/1981 | Bartholic | 208/93 |
| 4,267,032 | 5/1981 | Burk et al. | 208/120 |
| 4,331,563 | 5/1982 | McKay | 208/120 |

FOREIGN PATENT DOCUMENTS 34958 5/1973 Australia .................. 423/62

OTHER PUBLICATIONS

Chemical Abstracts, vol. 53, No. 17, Sep. 10, 1959, "Regeneration of Spent Cracking Catalysts", & Vestnik Akad. Nauk Kazakh No. 16515F.
Chemical Abstracts, vol. 75, No. 20, Nov. 15, 1971, "Properties of Zeolite 4A treated in Molten Salts", & J. Inorg. Nucl. Chem. No. 1223994.

*Primary Examiner*—Paul E. Konopka
*Attorney, Agent, or Firm*—Inez L. Moselle

[57] ABSTRACT

Disclosed is a process for removing accumulated metals, particularly vanadium and nickel, from particulate aluminosilicate materials and aluminosilicate materials that are obtained by the process. The process may advantageously be used to remove accumulated metals from spent aluminosilicate contact materials used in selective vaporization processes of the type described in U.S. Pat. No. 4,263,128. The process of this invention yields materials suitable for effective recycling to a selective vaporization unit or for ecologically-acceptable disposal, as well as, optionally, recovery of metals in saleable form.

40 Claims, 2 Drawing Sheets

PROCESS FOR REMOVING METALS FROM ALUMINOSILICATE MATERIALS

This is a continuation of co-pending application Ser. No. 06/628,695 filed on July 6, 1984, now abandoned.

TECHNICAL FIELD

This invention relates to a process for removing accumulated metals, particularly vanadium and nickel, from particulate aluminosilicate materials and to the aluminosilicate materials obtained by the process. The process may advantageously be used to remove accumulated metals from spent aluminosilicate contact materials used in selective vaporization processes of the type described in U.S. Pat. No. 4,263,128. The process of this invention yields materials suitable for effective recycling to a selective vaporization unit or for ecologically-acceptable disposal, as well as, optionally, recovery of metals in saleable form.

BACKGROUND OF THE INVENTION

U.S. Pat. No. 4,263,128 discloses a selective vaporization process which reduces the Conradson Carbon and metals content of heavy hydrocarbon feedstocks destined for catalytic cracking or other hydrocarbon conversion processes. Broadly, the selective vaporization system comprises a contactor, a burner/regenerator and an inventory of circulating, fluidizable, essentially inert contact material. Rapid application of heat, generated within the burner and carried by the circulating inventory of inert contact material, selectively vaporizes most of the hydrocarbon components of the feed. During this selective vaporization, non-vaporized components of the feedstock, including metals, are deposited on the contact material. The spent contact material, bearing deposits of Conradson Carbon and metal components of the hydrocarbon feedstock, is then introduced into a burner/regenerator where combustible portions of the deposited materials are oxidized. The contact material is then recycled to the contactor. Because contaminating metal deposits are not concurrently removed in the regenerator, the quantity of metal contaminants on a particle of contact material typically increases during each of its cycles through the selective vaporization unit.

The accumulated metals that are deposited on the contact material during selective vaporization can have undesirable effects upon the properties of the material. For example, excessive quantities of vanadium on the contact material can cause the material to agglomerate in the selective vaporization unit. In practice, in selective vaporization processes, the metals content of the selective vaporization contact material has been held at acceptable levels by withdrawing a portion of that material on a continuous or semi-continuous basis and replacing it with fresh contact material. In order to maintain the overall efficiency of selective vaporization processes, it would be desirable to remove the metals from the contact material that is withdrawn from the selective vaporization unit and then to recycle the metals-depleted contact material back to the selective vaporization unit. In addition, it would be desirable to recover the metals removed from the contact material in saleable form.

The '128 patent discloses that the preferred contact material for selective vaporization comprises calcined kaolin clay, an aluminosilicate material. Metals which deposit and build up on the surface of such contact material during the selective vaporization step tend to combine chemically with the material during the combustion step. Separation of those metals from the contact material is difficult, often leading to degradation of the material itself during the metals-removal process.

Metals extraction processes which lead to co-extraction of alumina or silica are not useful in treating aluminosilicate materials, such as calcined kaolin clay, because such processes adversely affect the integrity of the materials. For example, approximately 90% vanadium recovery could be obtained by boiling the particles in 10% caustic soda but the particles are degraded and become essentially useless as a contact material thereafter. Decreasing the severity by lowering the temperature or concentration of caustic decreases the vanadium recovery significantly but the amounts of alumina and silica extracted are sufficient to interfere with subsequent liquid ion extraction processes for recovering the metal. As another example, strong mineral acids will extract nickel and vanadium from aluminosilicate contact materials, such as microspheres of calcined kaolin clay, but alumina is co-extracted, leading to a reduction in the amount of material available for recycling, an undesirable increase in the surface area of the microspheres and decreased attrition resistance depending upon the amount of alumina extracted.

SUMMARY OF THE INVENTION

The present invention is directed to a process for the effective reactivation of spent metals-containing aluminosilicate contact materials used in selective vaporization processes and the recovery of accumulated metals, particularly vanadium and nickel, from those materials. In a preferred process of the invention, the vanadium and nickel are recovered in saleable forms. A particularly advantageous feature of the process is that the integrity of the treated aluminosilicate contact material is neither destroyed nor unduly degraded physically or chemically and it may be recycled to the selective vaporization unit substantially free of contaminating metals. Alternatively, the treated contact material may be disposed of in an ecologically-acceptable manner.

Broadly, the process of the present invention comprises: (a) contacting an aluminosilicate material contaminated with nickel and vanadium values with an alkali chloride selected from the group consisting of lithium chloride, potassium chloride, or mixtures thereof, in the substantial absence of moisture, at a temperature above the melting point of the chloride or chlorides, under conditions effective to convert the nickel and vanadium in the aluminosilicate material to a soluble form and (b) removing the nickel and vanadium values from the aluminosilicate material.

In a first embodiment of the invention, the alkali chloride is potassium chloride, or a mixture of potassium chloride and lithium chloride. In this first embodiment, the nickel and vanadium values may be removed from the aluminosilicate material that is obtained in step (a) in a multi-stage process comprising: (1) contacting the aluminosilicate material with an aqueous liquid to obtain an aqueous extract of nickel chloride, (2) separating the aluminosilicate material from the aqueous extract of nickel chloride obtained in step (1), and (3) treating the aluminosilicate material that is obtained in step (2) to remove the vanadium values therefrom. Preferably, step (3) is conducted by contacting the aluminosilicate material with an aqueous solution of a base, such as an alkali carbonate, to obtain an aqueous extract comprising vanadium values.

In a second embodiment of the invention, vanadium values are removed from the aluminosilicate material that is obtained in step (2) by contacting that material with an aqueous solution of hydrochloric acid, sulfuric acid, or mixtures thereof.

In a third embodiment of the invention, the alkali chloride is selected from the group consisting of potassium chloride, lithium chloride and mixtures thereof. In this embodiment, the nickel and vanadium values may be removed from the aluminosilicate material that is obtained in step (a) in a single stage process that comprises contacting that material with an aqueous solution of hydrochloric acid, sulfuric acid, or mixtures thereof, to extract the nickel and vanadium values from the aluminosilicate material.

As mentioned above, the aluminosilicate material obtained by the process of the invention is suitable for use in a selective vaporization process of the type described in U.S. Pat. No. 4,263,128. That material, after being treated by the process of this invention, is characterized by an alumina to silica molar ratio of about 1:2, a mullite content of about 10% by weight, an alkali metal oxide content of at least about 1% by weight, the alkali metal oxide being present as an oxidic material selected from the group consisting of lithium aluminosilicate, potassium aluminosilicate or admixtures thereof, depending upon which alkali metal chloride is used in the roast. Tridymite and cristobalite may also be present. These phases may be determined by x-ray diffraction.

DETAILED DESCRIPTION OF THE INVENTION

Figure 1:
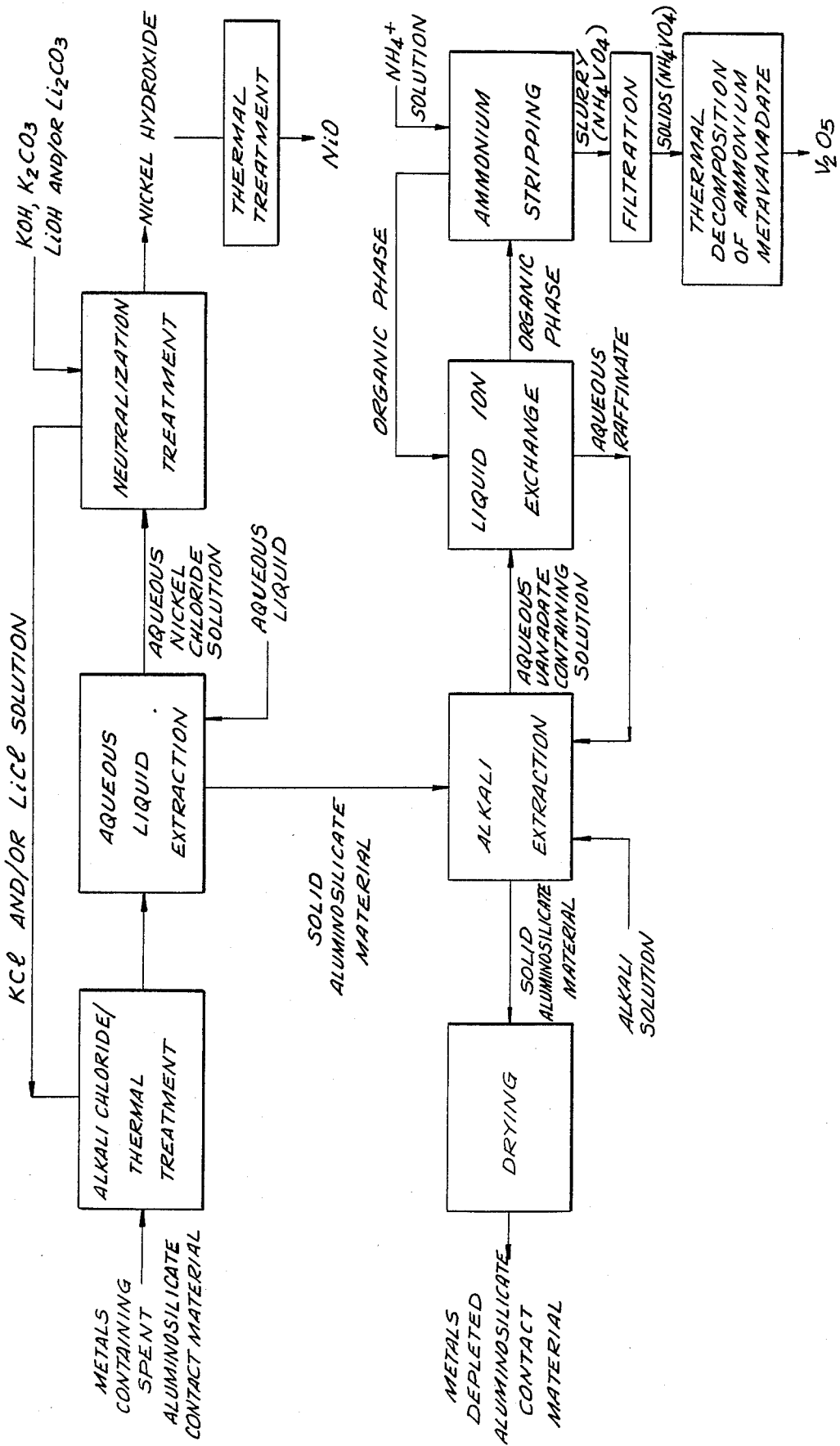
FIG. 1 is a schematic outline of a first preferred embodiment of the process of this invention.
Figure 2:
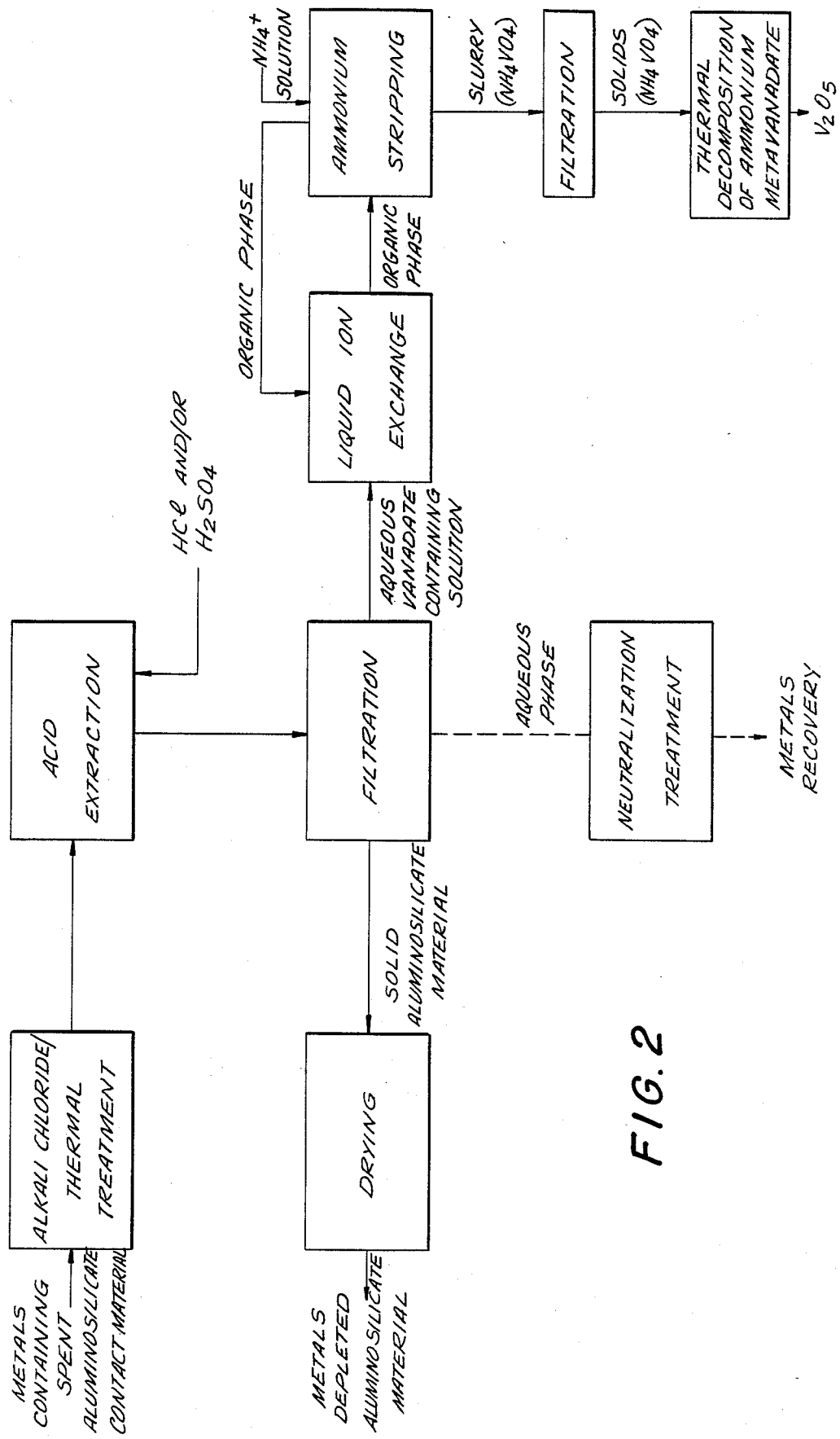
FIG. 2 is a schematic outline of another preferred embodiment of the process of this invention.

Referring to FIGS. 1 and 2, there are depicted two preferred embodiments of this invention. In each embodiment, the metals containing spent aluminosilicate contact material preferably was obtained from the charge of contact material utilized in a selective vaporization process of the type described in U.S. Pat. No. 4,263,128. Preferably, the contact material had been withdrawn from the burner/regenerator of a selective vaporization unit. Excess carbon borne by the contact material should be removed by calcining. Contact materials bearing carbon in the amount of less than about 0.04% by weight may be treated without precalcining but at a higher carbon loading, the contact material should normally be precalcined.

The preferred aluminosilicate contact material that may be treated by the process of the present invention comprises metals contaminated microspheres of calcined kaolin clay obtained from a selective vaporization process of the type described in U.S. Pat. No. 4,263,128. The microspheres of calcined kaolin clay that are utilized in such processes may be made, for example, by a process of the type described in U.S. Pat. No. 3,663,165 (Example 1, column 6, lines 44–57).

The chemical composition of the calcined kaolin clay microspheres that are preferably used in such selective vaporization processes generally corresponds to that of a dehydrated kaolin clay. Typically, the calcined microspheres analyze about 51 to 53% by weight $SiO_2$ 41 to 45% by weight $Al_2O_3$ and 0 to 1% by weight $H_2O$; the balance including minor amounts of indigenous impurities, notably iron, titanium and alkaline earth metals. Iron content (expressed as $Fe_2O_3$) and titanium content (expressed as $TiO_2$) are, usually, respectively, 0.4 to 2.5% by weight, and up to 2% by weight. The term "kaolin clay" as used herein embraces clays, the predominating mineral constituent of which is kaolinite, halloysite, nacrite, dickite, anauxite and mixtures thereof.

FIG. 1 depicts a first preferred embodiment of my invention in which the nickel and vanadium values are removed from the aluminosilicate material separately. In the first stage of this embodiment, the aluminosilicate material is contacted with potassium chloride, lithium chloride, or mixtures thereof, and is thermally treated in the substantial absence of moisture. The thermal treatment may be conducted in air, nitrogen or another inert dry gas. The amount of moisture present in the gas should be less than about 1%, preferably less than about 0.5%, still more preferably less than about 0.1% of the weight of the contact material being treated. During the thermal treatment, the nickel values in the aluminosilicate material are converted into a water soluble form. The heat treatment is preferably conducted at a temperature ranging between about 1450° and 2200° F., most preferably between about 1750° and 1950° F., for a time period between about 5 and 60 minutes, preferably, between about 10 and 30 minutes.

In the embodiment of FIG. 1, after the first stage alkali chloride/thermal treatment, the resulting mixture is contacted with an aqueous liquid under conditions sufficient to extract nickel values from the aluminosilicate material. For example, the mixture may be contacted with an aqueous liquid at 50°-60° C. for 15 minutes. The resulting solid and liquid phases are separated, preferably, by filtration and washing. The resulting aqueous phase includes extracted nickel, chloride ions and alkali metal ions. The presence of iron suppresses the solubility of vanadium, and therefore if desired, iron may be added to the aqueous liquid if the iron content of the contact material is not sufficient to prevent co-extraction of vanadium and nickel. The exact nature of the aqueous liquid used for extraction of the nickel chloride is not critical, as long as contaminants contained therein do not interfere with dissolution of the nickel chloride, removal of vanadium and recovery of lithium, if a mixture of chlorides is used in the thermal treatment.

The slightly acidic aqueous solution (e.g., a pH of about 1.5–3) that results from the aqueous liquid extraction step may be treated by a number of techniques to remove the nickel values therefrom. For example, it may be neutralized with potassium hydroxide, lithium hydroxide, or potassium carbonate, and/or lithium carbonate, to a pH of about 8.0 to precipitate the nickel as nickel hydroxide or carbonate, which is then separated from the aqueous phase. The pH values of the solutions and slurries referred to herein are the pH values that those solutions and slurries would have at 25° C.

The precipitate that is separated in the process described in the preceding paragraph may then be heated to obtain nickel oxide. The aqueous phase from which the precipitate is separated contains alkali chloride and may be recycled for use in the alkali chloride/thermal treatment step described above.

Nickel values may be recovered from the solution that results from the aqueous liquid extraction step by a technique other than the precipitation technique described above. For example, the nickel ions may be removed by liquid ion exchange or electrolysis.

In the first embodiment of my invention, iron and vanadium may be co-extracted along with nickel from the aluminosilicate material during the aqueous liquid extraction step described above. I have discovered that the amount of vanadium that is extracted during the aqueous liquid extraction step may be minimized by maintaining the iron content of the aqueous phase at a certain minimum level. In particular, the extraction of vanadium may be minimized by maintaining the iron content of the aqueous phase at a level of at least about 50 ppm by weight $Fe_2O_3$, preferably at least about 150 ppm by weight $Fe_2O_3$.

The iron content may be maintained at these levels by utilizing high iron content aluminosilicate material (e.g., metals contaminated calcined kaolin clay containing about 1.5 to 2.5% by weight $Fe_2O_3$), by adding iron (e.g., as ferric oxide) to the aluminosilicate material before the thermal treatment step, or, preferably, by adding iron (e.g., as ferric chloride) to the aqueous phase during the aqueous liquid extraction step.

Generally, I have found that if the pH of the aqueous liquid extract solution is greater than about 2.5, then in order to have a suitable iron content in the aqueous phase, ferric chloride may be added to reduce the pH to, preferably, between about 1.7 and 2.3, most preferably about 2.3. I prefer to add the iron as ferric chloride because it causes a comparatively small increase in the ferric oxide content of the treated contact material, with most of the iron remaining in the aqueous phase during the aqueous liquid extraction step.

When the alkali chloride that is used in the first embodiment of my invention is a mixture of potassium chloride and lithium chloride, the weight ratio of KCl to LiCl is most preferably between about 1:1 and 2:1, preferably in the range of from about 1.5:1 to 1.7:1. In order to minimize extraction of vanadium in the aqueous liquid extraction step for removal of nickel, the weight ratio of KCl to LiCl should be at least about 1.2:1. The total weight of the alkali metal chlorides should preferably be at least about 10%, more preferably, about 15% of the weight of the contact material to be treated. Far larger amounts of the chlorides may be used if desired. In addition, the solids to aqueous liquid weight ratio in the aqueous liquid extraction should preferably be between about 1.5:1 to 2:1.

As depicted in FIG. 1, the solid aluminosilicate material resulting from the aqueous liquid extraction step is subjected to an alkali extraction treatment to remove vanadium values from that material. In that treatment, the aluminosilicate material is contacted with an aqueous solution of an alkali selected from the group consisting of alkali hydroxide, alkali carbonate, and mixtures thereof.

Preferably, in the alkali extraction step, the aluminosilicate material is contacted with an alkali carbonate solution, such as sodium carbonate or, most preferably potassium carbonate, to extract the vanadium as soluble alkali vanadate. Preferably, the contact takes place at or near the boiling point of the alkali carbonate solution. The alkali carbonate solution used typically contains at least about 1.5% by weight alkali carbonate.

When lithium chloride or a mixture of lithium chloride and potassium chloride is used in the thermal treatment step, an alkali acetate, a mixture of an alkali carbonate and an alkali acetate, or a mixture of an alkali acetate and alkali hydroxide, at a temperature above the melting point of the alkali acetate, is preferably utilized as the alkali in the alkali extraction step, so that a substantial quantity of the lithium in the aluminosilicate material may be extracted therefrom. Substantial quantities of the lithium extracted from the aluminosilicate material may be recovered without adversely affecting the extraction of vanadium values from the material.

After alkali extraction, the solid and liquid phases are separated, e.g., by filtration and washing. The metals-depleted aluminosilicate material may then be dried and recycled for use in a selective vaporization unit.

In those embodiments of the invention in which lithium chloride is utilized in the alkali chloride/thermal treatment step described above, a substantial quantity of lithium, a relatively expensive material, becomes deposited on the aluminosilicate material. As described above, a substantial quantity of the lithium may be extracted from the aluminosilicate material by conducting the alkali extraction step in the presence of an alkali acetate under a set of specified conditions. Alternatively, a substantial quantity of the lithium may be removed from the aluminosilicate material by contacting the material with an alkali acetate material after the alkali extraction step. For example, the lithium could be extracted from the aluminosilicate material by a variation of the process for extracting lithium from B-spodumene described in U.S. Pat. No. 2,924,507, using potassium acetate in place of sodium acetate. Specifically, in such a variation, the aluminosilicate material is contacted with molten potassium acetate at a temperature of about 324° C. and at ambient pressure, to obtain a molten material containing lithium acetate. The resulting lithium acetate containing material may be dissolved into an aqueous solution into which potassium carbonate is introduced to precipitate the lithium as lithium carbonate. After recovery of the solid lithium carbonate, the remaining potassium acetate solution may be utilized or disposed of in an appropriate way.

The aqueous vanadate containing solution that is obtained from the alkali extraction step preferably is treated for recovery of vanadium. Vanadium recovery may be carried out by a liquid ion exchange technique using a quaternary amine in the carbonate, sulfate or chloride form. In such a technique, the aqueous vanadate containing solution is contacted with the quaternary amine to extract the vanadate ions from the aqueous phase to the organic phase (i.e., the quaternary amine phase).

quaternary amines that are useful in the liquid ion exchange step of the process are described in Australian Patent Specification No. 245,763. Such a material is commercially available, in the chloride form, as Aliquat 336 Liquid Ion Exchange Reagent ®. In the most preferred embodiment of the invention, the quaternary amine that is utilized in the ion exchange step is Aliquat 336 Liquid Ion Exchange Reagent ® that has been converted to the carbonate form by treatment with an alkali carbonate. Alternatively, the quaternary amine may be used in sulfate form, which is obtained by treating the quaternary amine with sulfuric acid.

I prefer to use the quaternary amine in its carbonate form, because the aqueous phase resulting from the liquid ion exchange step may then be utilized, in whole or in part, as a feed stream to the alkali extraction step that was described above without introducing chloride ions into that step.

The organic phase from the liquid ion exchange step may be stripped with an ammoniacal solution, such as an ammonia and ammonium chloride containing solution, for a time sufficient to precipitate substantial quantities of the vanadium as ammonium metavanadate. If ammonium ions are provided in the form of an aqueous alkaline solution other than an ammonia and ammonium chloride containing solution, e.g., an aqueous solution comprising ammonium carbonate and ammonium sulfate, the ammonium metavanadate is precipitaed by evaporation of ammonia. Typically, the organic phase is contacted with the ammonia and ammonium chloride containing solution for a period between about 1 and 5 minutes, at a temperature between ambient temperature and about 50° C.

Vanadium is recovered as solid ammonium metavanadate from the ammoniacal stripping step. The ammonium metavanadate may then be thermally decomposed to vanadium pentoxide. The organic phase from the ammonium stripping step may be reconverted to the carbonate form then recycled to the liquid ion exchange step.

The aqueous raffinate resulting from the liquid ion exchange step is preferably recycled to the alkali extraction step. If the quaternary amine used in the liquid ion exchange step was in the sulfate form, it is preferred to remove a portion of the sulfate from the aqueous raffinate before recycling it to the alkali extraction step to maintain the sulfate concentration below about 60 g/l. This may be accomplished by precipitating the sulfate as barium sulfate by adding an appropriate amount of barium carbonate to the aqueous raffinate.

An advantage of the first embodiment of the invention described hereinabove is that nickel values are first extracted from the aluminosilicate material into an aqueous phase with no significant co-extraction of vanadium and then vanadium values are extracted from the aluminosilicate material in a separate step. This sequential separation of nickel and vanadium is desirable because complicated and expensive separation techniques would be required to separate the vanadium and nickel values from each other if they had been co-extracted from the aluminosilicate material.

Another advantage of the first embodiment of the invention is that it does not result in large amounts of liquid wastes. In particular, as described above, the liquid streams obtained in the first embodiment may be effectively recycled, with resultant savings in material and disposal costs.

In a second embodiment of my invention, after the nickel has been removed by extraction with water, the vanadium is removed by extraction with an acid. Acid extraction may be accomplished by contacting the solid aluminosilicate material obtained from the water extraction step with an aqueous acid solution comprising sulfuric acid, hydrochloric acid or mixtures thereof. The resulting liquid phase, which contains vanadium values, may then be treated by liquid ion exchange processes to recover the vanadium therefrom, as described in U.S. Pat. No. 4,126,663. The solid phase resulting from the acid extraction step may be treated as in the first embodiment described above.

In a third embodiment of my invention, shown in FIG. 2, the aluminosilicate material is contacted with potassium chloride, lithium chloride, or mixtures thereof, and heated under the same conditions described above in connection with the description of the alkali chloride/thermal treatment of the first embodiment of the invention. Thereafter, the nickel and vanadium values in the aluminosilicate material are co-extracted therefrom by contacting that material with an aqueous solution of hydrochloric acid or sulfuric acid, or mixtures thereof. Preferably, the contact occurs at a solids:liquid ratio of between about 1:1 and 1:2 and at an elevated temperature (e.g., boiling) for between about 1 and 3 hours in a closed vessel. The resulting solid and liquid phases are separated by filtration or centrifugation and then washed. The aluminosilicate solids may then be recycled. The aqueous phase, which contains extracted nickel and vanadium values, may be treated by liquid ion exchange for vanadium recovery. Alternatively, the aqueous phase may be neutralized and then treated by conventional methods for metals recovery or disposed of in any ecologically-acceptable manner.

When the acid reactant used in the extraction is hydrochloric acid, it is preferably used as a solution containing from about 10 to about 36% HCl by weight, preferably from about 15 to about 20% by weight and the solids:liquid ratio should be about 1:1. The preferred reaction conditions include heating at or near the boiling point for between about 30 minutes and 3 hours.

When the acid reactant is sulfuric acid, it is preferably used as a solution having a concentration of up to about 70% by weight, preferably about a 40-70% solution, more preferably about a 45-60% solution and the solids:liquid ratio should be about 1:1. The preferred reaction conditions include heating at or near the boiling point for at least about 30 minutes, preferably from about 45 minutes to 2 hours.

EXAMPLES

The following examples demonstrate various alternative embodiments of the process of the present invention, as well as the results of optimization studies carried out for each embodiment. The examples are set forth for the purpose of illustration only and are not to be construed as limiting the scope of the invention in any manner.

In each example, the following procedure was employed. Samples of spent aluminosilicate contact material microspheres of calcined kaolin clay as described above were obtained from the burners of selective vaporization units. The mullite content of these samples had increased to about 10%.

In each example, the spent aluminosilicate contact material was mixed with an alkali chloride solution, oven-dried slowly to about 220° C. and introduced into a substantially-closed, electrically heated, Lindberg crucible furnace (Model F-95454). Thermal treatment was conducted in the presence of oxygen. Since the heating occurred in static air in a closed crucible, the moisture driven off during heating was not free to re-enter the crucible.

After thermal treating, the reaction product was stirred and extracted with water (solids/liquid weight ratio=1:1.6) at a temperature of about 50° C. to 60° C. for about 30 min to extract nickel chloride, filtered, washed and dried.

In some examples, the filter cake (solid phase) was further treated by extracting it with water and then by refluxing it with a 1.5 to 2% by weight alkali carbonate solution (solids/liquid weight ratio=1:2) for about 30 min to extract vanadium as soluble alkali vanadate. The resulting solid and liquid phases were separated and the metals-depleted contact material, which was suitable for recycling to a selective vaporization unit, was analyzed for its metals content. Extraction of vanadate ions from the carbonate extracts was effected by shake-out tests in separatory funnels using Aliquat 336 Liquid Ion Exchange Reagent ®. The filter washes from both the alkali chloride treatment/water extraction and alkali carbonate extraction were analyzed for their metals content.

Example 1—Potassium Chloride Reaction/Potassium Carbonate Extraction

The procedure set forth above was employed using a 25% KCl solution in the alkali chloride treatment step, in a proportion of 32% by weight of KCl based upon the dry weight of KNV/J spent aluminosilicate contact material, and a 2% $K_2CO_3$ solution for the alkali carbonate extraction.

The KNV/J material had a vanadium and nickel content of 1.26% V and 0.22% Ni, by weight, as well as 0.02% C, 0.044% S, 0.47% $Na_2O$, 54% $SiO_2$, 2.43% $Fe_2O_3$ and 42% $Al_2O_3$.

The resulting filter washes were analyzed for content of V, Ni and $Na_2O$. Extraction efficiencies were calculated from final contact material filter cake analyses; the small differences between these extractions and those based on filter analyses reflected volatilization losses. The results of these analyses are shown in Tables I and II.

TABLE I

KCl REACTION/$K_2CO_3$ EXTRACTION

| Reaction Conditions Temp/Time °F./Mins | V % | Ni % | V + Ni % | $Na_2O$ % | $K_2O$ in Filter Cake (%) |
|---|---|---|---|---|---|
| | % Extracted Based on Filter Cakes | | | | |
| 1800/15 | 54 | 59 | 55 | 53 | 3.28 |
| 1800/30 | 55 | 64 | 56 | 55 | 4.13 |
| 1850/15 | 55 | 64 | 56 | 57 | 3.75 |
| 1850/30 | 58 | 68 | 59 | 57 | 4.49 |
| 1900/15 | 56 | 68 | 58 | 57 | 4.10 |
| 1900/30 | 54 | 68 | 56 | 51 | 5.14 |
| 1950/15 | 57 | 68 | 59 | 49 | 4.81 |
| 1950/30 | 56 | 73 | 59 | 45 | 6.22 |

Average V + Ni Extracted: 57 ± 2%.

TABLE II

KCl REACTION/$K_2CO_3$ EXTRACTION: V, Ni AND $Na_2O$ EXTRACTIONS

| Reaction Conditions Temp./Time °F./Mins | % Extracted in $H_2O$ | | | % Extracted in 2% $K_2CO_3$ | | | Total % Extracted. in Filter Washes | | | % Extracted Based on Filter Cakes | | | Apparent Volatilization* (%) | |
|---|---|---|---|---|---|---|---|---|---|---|---|---|---|---|
| | V | Ni | $Na_2O$ | V | Ni | $Na_2O$ | V | Ni | $Na_2O$ | V | Ni | $Na_2O$ | V | Ni |
| 1800/15 | 0.5 | 57 | 64 | 43 | — | 6 | 43 | 57 | 70 | 54 | 59 | 53 | 11 | 2 |
| 1800/30 | 0.3 | 61 | 67 | 41 | — | 6 | 42 | 61 | 73 | 55 | 64 | 55 | 13 | 3 |
| 1850/15 | 0.3 | 65 | 67 | 43 | — | 6 | 43 | 65 | 73 | 55 | 64 | 57 | 12 | — |
| 1850/30 | 0.3 | 65 | 64 | 42 | — | 11 | 42 | 65 | 75 | 58 | 68 | 57 | 16 | 3 |
| 1900/15 | 0.3 | 67 | 65 | 44 | — | 7 | 44 | 67 | 72 | 56 | 68 | 57 | 12 | 1 |
| 1900/30 | 0.3 | 69 | 57 | 38 | — | 7 | 39 | 69 | 64 | 54 | 68 | 51 | 15 | — |
| 1950/15 | 0.3 | 69 | 60 | 41 | — | 7 | 42 | 69 | 67 | 57 | 68 | 49 | 15 | — |
| 1950/30 | 0.2 | 70 | 46 | 30 | — | 7 | 30 | 70 | 53 | 56 | 73 | 45 | 26 | 3 |

*As % of V or Ni in feed (spent contact material).

These results demonstrate that vanadium and nickel extractions were relatively independent of reaction temperature and time in the range of about 1800° F. to 1950° F. and about 15 to 30 min, with S an average nickel extraction of about 67% and an average vanadium extraction of about 56%; or a total nickel and vanadium metals extraction of 57%±2%. About 15%, on average, of the vanadium extracted was volatilized, with no significant nickel volatilization. The use of KCl in the alkali chloride/thermal treatment step provided virtually complete segregation of vanadium and nickel between the first (water) and the second (carbonate) extractions.

The extracted aluminosilicate contact material showed no weight loss after the treatments and the small weight gains observed—1.6% to 6%—were due to the $K_2O$ pick-up, which increased with time and temperature of the treatments. About 50% to 70% of the $Na_2O$ was extracted and this was largely independent of specific reaction conditions. This advantageously prevented sodium build-up.

Example 2—Potassium Chloride+Lithium Chloride Reaction/Potassium Carbonate Extraction In this example, I employed mixtures of KCl and LiCl, in varying proportions relative to each other and relative to the weight of the KNV/J spent aluminosilicate contact material. Analyses were carried out as in Example 1 and the results are shown in Tables III and IV.

These results demonstrate that vanadium and nickel extractions were relatively independent of reaction temperature and time, in the range of about 1800° F. to 1950° F. and about 15 to 30 min, with an average nickel extraction of about 79% and an average vanadium extraction of about 67%; or a total nickel and vanadium metals extraction of about 69 to 70%. Between about 16% and 28% of the vanadium extracted was volatilized, with 16% to 18% volatilized at the preferred shorter reaction time. No nickel was volatilized.

The function of KCl in the alkali chloride/thermal treatment step was to facilitate segregation between the first and second extractions. As the proportion of KCl in the KCl/LiCl mixture increased, there was no effect upon either the levels of vanadium or nickel extraction, although it with some increase in $K_2O$ pick-up. The extracted contact material showed a small weight gain, due to $K_2O$ and $Li_2O$ pick-up.

TABLE III

KCl/LiCl REACTION/$K_2CO_3$ EXTRACTION

| Conditions Temp./Time °F./Mins | KCl + LiCl % of KNV/J | | Filter Cakes | | | Filter Cake | |
|---|---|---|---|---|---|---|---|
| | KCl | LiCl | V | Ni | V + Ni | $K_2O$ | $Li_2O$ |
| | | | (%) | | | (%) | |
| 1800/15 | 24.4 | 20.0 | 65 | 77 | 67 | 2.50 | 1.87 |
| 1800/30 | 24.4 | 20.0 | 68 | 77 | 70 | 2.22 | 2.65 |
| 1850/15 | 24.4 | 20.0 | 66 | 77 | 68 | 2.44 | 1.28 |
| 1850/30 | 24.4 | 20.0 | 68 | 77 | 70 | 2.57 | 2.03 |
| 1900/15 | 24.4 | 20.0 | 65 | 77 | 67 | 3.65 | 2.76 |

TABLE III-continued
KCl/LiCl REACTION/K₂CO₃ EXTRACTION

| Reaction Conditions Temp./Time °F./Mins | KCl + LiCl % of KNV/J KCl | | % Extracted Based on Filter Cakes V Ni V + Ni (%) | | | Filter Cake K₂O Li₂O (%) | |
|---|---|---|---|---|---|---|---|
| | KCl | LiCl | V | Ni | V + Ni | K₂O | Li₂O |
| 1900/30 | 24.4 | 20.0 | 68 | 82 | 70 | 3.36 | 2.80 |
| 1950/15 | 24.4 | 20.0 | 65 | 73 | 66 | 3.21 | 1.10 |
| 1950/30 | 24.4 | 20.0 | 71 | 82 | 72 | 3.04 | 2.83 |
| 1850/15 | 32.0 | 20.0 | 67 | 77 | 68 | 2.79 | 0.92 |
| 1950/15 | 32.0 | 20.0 | 66 | 82 | 68 | 3.96 | 0.82 |
| 1950/30 | 32.0 | 20.0 | 65 | 82 | 68 | 4.80 | 1.74 |

Average V + Ni extracted: 69%.

TABLE IV
KCl/LiCl REACTION/K₂CO₃ EXTRACTION: V AND Ni RECOVERY

| Reaction Conditions Temp/Time °F./Mins. | % of KNV/J | | % Extracted In H₂O | | In 2% K₂CO₃ | | Total % Extracted in Filter Washes | | % Extracted Based on Filter Cakes | | | Apparent Volatilization %* | |
|---|---|---|---|---|---|---|---|---|---|---|---|---|---|
| | KCl | LiCl | V | Ni | V | Ni | V | Ni | V | Ni | V + Ni | V | Ni |
| 1800/15 | 24.4 | 20.0 | 0.5 | 81 | 47 | — | 47 | 81 | 65 | 77 | 67 | 18 | — |
| 1800/30 | 24.4 | 20.0 | 0.4 | 81 | 47 | — | 48 | 81 | 68 | 77 | 70 | 20 | — |
| 1850/15 | 24.4 | 20.0 | 0.5 | 82 | 47 | — | 47 | 82 | 66 | 77 | 68 | 19 | — |
| 1850/30 | 24.4 | 20.0 | 0 | 83 | 45 | — | 45 | 83 | 68 | 77 | 70 | 23 | — |
| 1900/15 | 24.4 | 20.0 | 0.5 | 80 | 43 | — | 43 | 80 | 65 | 77 | 67 | 22 | — |
| 1900/30 | 24.4 | 20.0 | 0.4 | 86 | 43 | — | 43 | 86 | 68 | 82 | 70 | 25 | — |
| 1950/15 | 24.4 | 20.0 | 0.2 | 80 | 46 | — | 47 | 80 | 65 | 73 | 66 | 18 | — |
| 1950/30 | 24.4 | 20.0 | 0.6 | 83 | 42 | — | 43 | 83 | 71 | 82 | 72 | 28 | — |
| 1850/15 | 32.0 | 20.0 | 0.5 | 82 | 49 | — | 49 | 82 | 67 | 77 | 68 | 16 | — |
| 1950/15 | 32.0 | 20.0 | 0.7 | 85 | 49 | — | 50 | 85 | 66 | 82 | 68 | 16 | — |
| 1950/30 | 32.0 | 20.0 | 0.7 | 83 | 38 | — | 39 | 83 | 65 | 82 | 68 | 26 | — |

*As % of V or Ni in feed (spent aluminosilicate contact material).

The use of lithium chloride in the alkali chloride/thermal treatment step incurs lithium replacement costs, due to $Li_2O$ pick-up by the contact material $Li_2O$ levels in the extracted contact material represent the need for make-up lithium carbonate. Recovery of up to 80% to 90% of the $Li_2O$ from the extracted material is possible by treating the material with potassium acetate or sodium acetate before returning it to the selective vaporization contactor for recycling.

Table V demonstrates the results of varying the KCl/LiCl ratios at a fixed reaction temperature and time of 1900° F. and 30 minutes, respectively. The spent aluminosilicate contact material treated (KNV/H) contained 1.34V, 0.36% Ni and 1.55% $Fe_2O_3$ by weight. It was found that with a fixed KCl addition (24.4%), LiCl addition could be reduced from 20% to 15% without affecting the vanadium or nickel extraction efficiency and with the advantage of some reduction in lithium loss. With fixed LiCl addition, although a 20% or 25% reduction in KCl addition did not significantly affect the levels of overall vanadium or nickel extraction, vanadium and nickel were no longer segregated between the water and carbonate extracts. Only in the cases where the KCl/LiCl ratio was at least 1.2:1 was the vanadium substantially segregated into the second (carbonate) extract. At lower KCl levels, vanadium was distributed between the two extracts.

TABLE V
KCl/LiCl REACTION/K₂CO₃ EXTRACTION: VARYING KCl + LiCl ADDITIONS

| % of KNV/H | | % Extracted In H₂O | | In 2% K₂CO₃ | | Total % Extracted in Filter Washes | | % Extracted Based on Filter Cakes | | | Apparent Volatilization %* | |
|---|---|---|---|---|---|---|---|---|---|---|---|---|
| KCl | LiCl | V | Ni | V | Ni | V | Ni | V | Ni | V + Ni | V | Ni |
| 24.4 | 20.0 | 0.6 | 76 | 52 | — | 53 | 76 | 62 | 83 | 66 | 9 | 7 |
| 24.4 | 15.0 | 0.5 | 80 | 56 | — | 56 | 80 | 62 | 83 | 66 | 6 | 3 |
| 24.4 | 10.0 | 0.3 | 66 | 41 | — | 41 | 66 | 51 | 81 | 58 | 10 | 15 |
| 24.4 | 5.0 | 0.2 | 70 | 39 | — | 39 | 70 | 45 | 75 | 51 | 6 | 5 |
| 24.4 | — | 0.5 | 63 | 41 | — | 42 | 63 | 49 | 64 | 52 | 7 | 1 |
| 10.0 | 20.0 | 12 | 66 | 45 | — | 57 | 66 | 73 | 81 | 75 | 16 | 15 |
| 5.0 | 20.0 | 12 | 36 | 32 | — | 44 | 36 | 74 | 56 | 70 | 30 | 20 |
| 10.0 | 25.0 | 23 | 70 | 41 | — | 64 | 70 | 72 | 78 | 74 | 8 | 4 |
| 5.0 | 25.0 | 35 | 32 | 24 | — | 60 | 32 | 75 | 50 | 70 | 15 | 38 |

*As % of V or Ni in Feed (spent aluminosilicate contact material).

Example 3—Potassium Chloride+Lithium Chloride Reaction/Potassium Carbonate Extraction In this example, 25 g samples of spent aluminosilicate contact material containing 1.7% V, 0.41% Ni and 1.66% $Fe_2O_3$ by weight, designated KNV/K, were blended with mixtures of a 25% KCl solution and a 25% LiCl solution, in varying proportions relative to each other and relative to the dry weight of the contact material. The contact material and KCl/LiCl mixture was heated to 1850° F. for 15 minutes then extracted with water at 50°–60° C. and then further extracted with 2% $K_2CO_3$ under reflux.

While the KCl/LiCl ratios varied in this example, reaction temperature and time remained fixed at 1850° F. and 15 minutes, respectively. Analyses were carried out as in Example 1 and the results are shown in Table VI.

I found that metals extractions of about 70% resulted with mixtures of 20 or 24.4% KCl and 20% LiCl, or 24.4% KCl and 15% LiCl, based upon the dry weight of the spent contact material. The optimal ratio for spent contact material/KCl/LiCl ranged between 100:20:15 to 100:24.4:20. The preferred KCl/LiCl weight ratio, in terms of metals extraction, metals separation and minimal retention of Li$_2$O in the solids was determined to be 1.6:1.

TABLE VI
KCl/LiCl REACTION/K$_2$CO$_3$ EXTRACTION: VARYING KCl + LiCl ADDITIONS

| % of KNV/K | | % Extracted | | | | Total % Extracted in Filter Washes | | % Extracted Based on Filter Cakes | | | Apparent Volatilization %* | | Li$_2$O in Filter Cake (%) |
|---|---|---|---|---|---|---|---|---|---|---|---|---|---|
| KCl | LiCl | In H$_2$O | | In 2% K$_2$CO$_3$ | | | | | | | | | |
| | | V | Ni | V | Ni | V | Ni | V | Ni | V + Ni | V | Ni | |
| 24.4 | 15.0 | 0.2 | 66 | 62 | — | 62 | 66 | 66 | 83 | 69 | 4 | 17 | 1.6 |
| 24.4 | 12.0 | 0.2 | 79 | 57 | — | 57 | 79 | 58 | 80 | 62 | 1 | 1 | 1.4 |
| 20.0 | 15.0 | 0.2 | 83 | 56 | — | 56 | 83 | 63 | 83 | 67 | 7 | — | 1.9 |
| 20.0 | 12.0 | 4.0 | 46 | 47 | 0.5 | 51 | 47 | 54 | 61 | 57 | 3 | 10 | 2.0 |
| 15.0 | 15.0 | 4.0 | 85 | 60 | — | 64 | 85 | 62 | 83 | 66 | — | — | 2.2 |
| 15.0 | 12.0 | 5.0 | 83 | 50 | — | 55 | 83 | 63 | 80 | 66 | 8 | — | 2.1 |
| 24.4 | 20.0 | 0.2 | 68 | 64 | — | 64 | 68 | 68 | 83 | 71 | 4 | 15 | 1.9 |
| 20.0 | 20.0 | 0.4 | 87 | 65 | — | 65 | 87 | 70 | 83 | 72 | 5 | — | 1.9 |
| 15.0 | 20.0 | 14.0 | 78 | 46 | — | 60 | 78 | 73 | 83 | 75 | 13 | 5 | 3.1 |

*As % of V or Ni in feed (spent aluminosilicate contact material).

Example 4—Potassium Chloride+Lithium Chloride Reaction/Potassium Acetate Extraction In this example, a 100 g sample of KNV/K spent aluminosilicate contact material was blended with 24.4g KCl and 20.0 g LiCl (dry basis) then heated to 1850° F. for 15 minutes. Nickel was extracted from the product with water at 50°–60° C. After extraction, the filter cake contained 1.73% V, 0.12% Ni, 1.47% K$_2$O and 1.32% Li$_2$O.

A 20 g aliquot of the filter cake was mixed with a solution containing 20 g potassium acetate and 20 g water. Thereafter, the mixture was dried at 220° C. and introduced into a Lindberg crucible furnace at 305° C. The temperature was slowly raised to 324° C. and maintained at this level for 30 minutes. I allowed the crucible to cool and extracted the contents by stirring with 100 ml water at 90°–100° C. for 30 minutes. I filtered the slurry and washed, dried and analyzed the solids. As a result, 92% of the Li$_2$O, and 39% of the vanadium were extracted, as indicated by analysis of the filter cake: 1.03% V, 0.12% Ni, 0.10% Li$_2$O, 6.12% K$_2$O.

Another 20 g aliquot of the filter cake was mixed with 20 g potassium acetate, with the addition of 0.65 g KOH, the equivalent of the 2% K$_2$CO$_3$ normally used in the second stage carbonate extraction, then heated as described above. As a result, 92% of the Li$_2$O was extracted and 68% of the vanadium was extracted, as indicated by analysis of the filter cake: 0.57% V, 0.12% Ni, 0.11% Li$_2$O and 5.93% K$_2$O.

Example 5—Potassium Chloride+Lithium Chloride Reaction/Alkali Acetate+Alkali Carbonate or Alkali Hydroxide Extraction Lithium recovery was studied for spent aluminosilicate contact material treatments in which the second stage extraction was an extraction with an alkali acetate and an alkali carbonate or an In this example, 300 g of spent aluminosilicate contact material, KNV/K, were mixed with 73.2 g KCl, 60.0 g LiCl and water in an evaporating dish to form a thin paste. The mixture was evaporated under a heat lamp with occasional stirring then dried for 1 hour at 220° C. The dry mixture was heated in 5 batches (85 g each) at 1850° F. for 15 minutes. The calcine (424 g) was crushed, screened (100 mesh sieve) and extracted with 300 ml water (55° C.) for 30 minutes. I filtered, dried and analyzed the resulting 300.0 g residue:

| | Ni | V | K$_2$O | Li$_2$O |
|---|---|---|---|---|
| Assay residue (%) | 0.10 | 1.7 | 1.4 | 2.2 |
| Metals extraction (%) | 77.2 | 7.4 | 91.0 | 67.6 |

Various lithium recovery procedures were studied by contacting a sample of the residue from the above-described first stage extraction with a concentrated solution of alkali acetate and alkali carbonate, or alkali acetate and alkali hydroxide, in a wide form crucible. The resulting slurries were evaporated under a heat lamp, then dried at 220° C. for 1 hour in an air oven. The dried product was placed in a 305° C. crucible furnace and the temperature was slowly increased to the desired final temperature value.

After the desired residence time had passed, the sample was removed, then crushed, screened (100 mesh sieve) and extracted with 10 times its weight of 55° C. water for 30 minutes. The resulting slurry was filtered and the filter cake washed with additional warm water. Tables VII and VIII indicate the metals content of the filtrate and dry filter cakes.

As shown in the Tables, lithium recoveries between 93 and 97% were obtained. Vanadium extraction efficiencies were fairly insensitive to process conditions and averaged about 74%. Lithium extraction according to these processes resulted in a nearly stoichiometric build-up of sodium or potassium oxide in the treated contact material.

The preferred reaction conditions for the second stage extraction, in terms of lithium recovery, were heating of the water-extracted contact material at about 324° C. for about 30 to 60 minutes with about 3 moles potassium atoms per mole lithium atoms present in the material. The potassium atom requirement was supplied from potassium acetate and potassium carbonate in he mole ratio of 2:0.5. These conditions provided a total lithium recovery of 97%. Residual metal content of the thus treated contact material was: 0.1% Ni, 0.53% V, 0.28% Li$_2$O and 7.6% K$_2$O. The second stage extraction procedures according to this example permitted simultaneous vanadium and lithium recovery while providing, for example, up to 72% total vanadium extraction.

With the use of sodium, rather than potassium salts, a slight reduction in extraction efficiencies was observed. Ninety-three percent lithium and 71% vanadium recoveries were achieved using 2.5 mole Na per mole Li and a 1:1 acetate:carbonate mole ratio and heating the contact material at 335° C. for 1 hour. Observed lithium fective removal of vanadium and effective recovery of lithium.

TABLE VII

KCl/LiCl REACTION/K SYSTEM 2ND STAGE EXTRACTION

| Sample Wt. (g) | K System Salts Wt. (g) | Thermal Treatment Temp./Time °C./Min | Final Filter Cake Analysis (%) | | | % Extracted 2nd Stage | | | Total* | | |
|---|---|---|---|---|---|---|---|---|---|---|---|
| | | | V | Li$_2$O | K$_2$O | V | Ni | Li$_2$O | V | Ni | Li$_2$O |
| 20.0 | 5.9 K acetate 2.1 K carbonate | 324/60 | 0.53 | 0.28 | 7.6 | 70 | 0 | 88 | 72 | 78 | 97 |
| 20.0 | 8.83 K acetate | 324/60 | 0.56 | 0.31 | 7.8 | 68 | 0 | 86 | 70 | 78 | 96 |
| 20.0 | 5.9 K acetate** 1.7 K hydroxide | 324/60 | 0.56 | 0.66 | 8.0 | 67 | 0 | 71** | 70 | 78 | 91 |
| 20.0 | 5.9 K acetate 2.1 K carbonate | 324/60 | 0.50 | 0.31 | 6.9 | 71 | 0 | 87 | 74 | 78 | 96 |
| 20.0 | 5.9 K acetate 2.1 K carbonate | 324/60 | 0.52 | 0.32 | 7.8 | 71 | 0 | 86 | 73 | 78 | 96 |
| 20.0 | 2.4 K acetate 3.4 K carbonate | 324/15 | 0.47 | 0.39 | 6.9 | 73 | 0 | 83 | 75 | 78 | 94 |
| 20.0 | 3.4 K acetate 4.7 K carbonate | 324/30 | 0.48 | 0.27 | 7.7 | 73 | 0 | 88 | 75 | 78 | 96 |
| 15.0 | 4.32 K acetate 1.55 K carbonate | 300/30 | 0.46 | 0.35 | 7.0 | 74 | 0 | 80 | 76 | 78 | 94 |
| 15.0 | 4.32 K acetate 1.55 K carbonate | 300/90 | 0.46 | 0.35 | 7.0 | 74 | 0 | 80 | 76 | 78 | 94 |
| 15.0 | 4.32 K acetate 1.55 K carbonate | 330/60 | 0.48 | 0.23 | 7.9 | 72 | 0 | 90 | 74 | 78 | 97 |
| 15.0 | 4.32 K acetate 1.55 K carbonate | 360/30 | 0.52 | 0.48 | 7.7 | 70 | 0 | 79 | 72 | 78 | 93 |
| 15.0 | 4.32 K acetate 1.55 K carbonate | 360/90 | 0.52 | 0.29 | 8.3 | 70 | 0 | 87 | 72 | 78 | 96 |
| 15.0 | 4.4 K acetate 1.3 K hydroxide | 324/60 | 0.70 | 0.93 | 7.8 | 59 | 0 | 58 | 62 | 78 | 86 |

*Recovered in first (water) extraction and second (acetate) extraction.
**Amount of acetate used was insufficient in view of high Li content of final filter cake.

TABLE VIII

KCl/LiCl REACTION/Na SYSTEM 2ND STAGE EXTRACTION

| Sample Wt. (g) | K System Salts Wt. (g) | Thermal Treatment Temp./Time °C./Min | Final Filter Cake Analysis (%) | | | | % Extracted 2nd Stage | | | Total | | |
|---|---|---|---|---|---|---|---|---|---|---|---|---|
| | | | V | Li$_2$O | Na$_2$O | K$_2$O | V | Ni | Li$_2$O | V | Ni | Li$_2$O |
| 15.0 | 3.6 Na acetate 1.2 Na carbonate | 344/60 | 0.56 | 0.64 | 4.8 | 1.1 | 68 | 0 | 72 | 71 | 78 | 91 |
| 15.0 | 1.5 Na acetate 2.0 Na carbonate | 344/60 | 0.55 | 0.60 | 4.5 | 1.1 | 69 | 0 | 74 | 72 | 78 | 92 |
| 15.0 | 1.5 Na acetate 2.0 Na carbonate | 335/60 | 0.56 | 0.53 | 4.4 | 1.0 | 69 | 0 | 77 | 71 | 78 | 93 |
| 15.0 | 3.6 Na acetate 0.9 Na hydroxide | 344/60 | 0.78 | 1.5 | N/A | 1.0 | 55 | 0 | 33 | 58 | 78 | 78 | recoveries with the use of sodium salts ranged from 91–93%, with 71–76% vanadium recovery. The use of sodium salts to recover lithium resulted in the retention of Na$_2$O (4.5%), as well as K$_2$O (1%), in the treated contact material.

When sodium hydroxide was used in place of the corresponding carbonates, lithium extraction was reduced by 20% and vanadium extraction by 10–20%, although the lithium extraction required less water.

According to an alternate embodiment of this process, I thermally treated spent aluminosilicate contact material with lithium chloride and extracted the mixture with water. The extracted and washed solids analyzed 1.3% V, 0.13% Ni and 3.2% Li$_2$O. The contact material was then refluxed with an equal weight of sodium acetate (anhydrous) as a 50% solution at the boiling point, with no added NaOH. It was found that only 59% of the Li$_2$O and 40% of the vanadium had been extracted.

Comparison of the results of this Example with those of Example 4 reveals that the combination of potassium acetate and potassium hydroxide provides for both ef- Example 6—Lithium Chloride Reaction/Water Extraction/Sulfuric Acid Extraction I contacted three batches of 100 g KNV/K spent aluminosilicate contact material (1.8% V, 0.41% Ni) each with 100 g of 25% LiCl, dried, and heated the mixtures for 15 minutes at 1850° F. The agglomerates were broken to pass 100 mesh, mixed and extracted with 300 ml water at 50°–60° C. for 1 hour with HCl (5.4 g of 36.5%) being added to reduce the pH to 1.0 and ensure dissolution of any precipitated nickel hydroxide. I filtered, washed and dried the samples and again passed them through a 100 mesh sieve. The product weighed 294.4 g and contained 1.3% V, 0.13% Ni and 3.2% Li$_2$O.

I divided the filter cake into 25 g aliquots and extracted the samples by refluxing with various amounts of 35% w/w for various reaction times and filtered and washed the products. The results are shown in Table IX.

I found that overall weight loss, coextraction of alumina and residual Li$_2$O content in the treated aluminosilicate contact material were generally independent of the relative proportion of 35% $H_2SO_4$ used in the extraction. Co-extraction of alumina and weight loss increased, and residual $Li_2O$ in the treated material decreased, with increasing reaction times.

Alternatively, higher concentrations of sulfuric acid such as 50-60% w/w may be used in the second stage extraction. For example, when, after the first stage LiCl reaction and water extraction, a 25 g spent contact material sample was refluxed for 1 hour with boiling 50% w/w $H_2SO_4$, extraction totals were 86% V and 83% Ni, with 10% $Al_2O_3$ extraction and $Li_2O$ content of 0.65% in the product. Thus, lithium chloride provides superior removal of metals as compared to potassium chloride but exacts a penalty in the processing required to recover the expensive lithium.

TABLE IX

LiCl REACTION/WATER EXTRACTION/$H_2SO_4$ EXTRACTION

| Amount 35% $H_2SO_4$ (ml) | Reflux Time (Min) | Total % Extracted ||||  Final Filter Cake Analysis (%) ||| Total Weight Loss (%) |
|---|---|---|---|---|---|---|---|---|---|
| | | V* | Ni* | V + Ni* | $Al_2O_3$** | V | Ni | $Li_2O$ | |
| 20 | 60 | 79 | 84 | 79 | 4 | 0.38 | 0.07 | 1.8 | 5 |
| 20 | 120 | 80 | 84 | 80 | 5 | 0.36 | 0.07 | 1.4 | 6 |
| 20 | 180 | 81 | 84 | 80 | 7 | 0.35 | 0.07 | 1.1 | 7 |
| 30 | 60 | 79 | 84 | 79 | 3 | 0.37 | 0.07 | 2.0 | 4 |
| 30 | 120 | 82 | 84 | 81 | 6 | 0.34 | 0.07 | 1.3 | 6 |
| 30 | 180 | 82 | 84 | 81 | 8 | 0.34 | 0.07 | 1.1 | 7 |
| 50 | 60 | 81 | 84 | 80 | 4 | 0.36 | 0.07 | 1.9 | 5 |
| 50 | 120 | 82 | 84 | 80 | 7 | 0.34 | 0.07 | 1.3 | 7 |
| 50 | 180 | 82 | 86 | 82 | 10 | 0.33 | 0.06 | 0.98 | 7 |

*Based on final filter cake analysis.
**Based on 35% $H_2SO_4$ extract.

The spent aluminosilicate contact material treated in Examples 1–6 had high iron content; containing between about 1.55 and 2.43% ferric oxide. In Examples 7 and 8, the spent aluminosilicate contact material had much lower iron content, ranging between 0.43 and 0.6% ferric oxide. The following examples demonstrate that the addition of iron, as ferric chloride, in the water extraction or as ferric oxide added to the alkali chloride-aluminosilicate material mixture before thermal treatment, ensured adequate separation of nickel and vanadium.

Example 7—Potassium Chloride Reaction/Potassium Carbonate Extraction—Low Iron Content Spent Aluminosilicate Contact Material: Ferric Chloride Addition In this example, I used a 25% KCl solution in the alkali chloride/thermal treatment step, in a proportion of 32 parts of KCl by weight per 100 parts by weight of KNV/C and KNV/P spent aluminosilicate contact material and a 2% $K_2CO_3$ solution for the alkali carbonate extraction. The KNV/C and KNV/P spent aluminosilicate contact materials contained much less iron than the KNV/H, KNV/J and KNV/K samples, as indicated by the following analysis:

| | % V | % Ni | % $Fe_2O_3$ |
|---|---|---|---|
| KNV/C | 0.92 | 0.21 | 0.60 |
| KNV/P | 0.85 | 0.22 | 0.43 |
| KNV/H | 1.34 | 0.36 | 1.55 |
| KNV/J | 1.26 | 0.22 | 2.43 |
| KNV/K | 1.7 | 0.41 | 1.66 |

I reacted 25 g samples of spent aluminosilicate contact material with KCl at 1950° F. for 15 minutes. I then extracted the samples with 40 ml water and 0.85 g $FeCl_3.6H_2O$ (equivalent to 1% $Fe_2O_3$ on the sample) or 0.43 g $FeCl_3.6H_2O$ (equivalent to 0.5% $Fe_2O_3$ on the sample) for 30 minutes. I carried out similar steps without the addition of $FeCl_3.6H_2O$. I then extracted the products with 50 ml of $K_2CO_3$ at reflux for 30 minutes, filtered and washed the products. The filter washes were analyzed and the results ar shown in Tables X and XI.

TABLE X

KCl REACTION/$K_2CO_3$ EXTRACTION - LOW IRON CONTENT SPENT ALUMINOSILICATE CONTACT MATERIAL: $FeCl_3$ ADDITION

| Contact Material Sample | $FeCl_3.6H_2O$ Added (g) | % Extracted ||||  Total % Extracted In Filter Washes || % Extracted Based on Filter Cakes || Analysis of Filter Cake (%) |||
|---|---|---|---|---|---|---|---|---|---|---|---|---|
| | | In $H_2O$ || In 2% $K_2CO_3$ || | | | | | | |
| | | V | Ni | V | Ni | V | Ni | V | Ni | V | Ni | $Fe_2O_3$ |
| KNV/C | 0.85 | 0.4 | 65.5 | 36.4 | — | 37 | 66 | 64 | 75 | 0.31 | 0.05 | 0.76 |
| KNV/C | 0.43 | 0.5 | 67.6 | 44.7 | — | 45 | 68 | 55 | 66 | 0.39 | 0.07 | 0.82 |
| KNV/C | 0 | 8.2 | 71.4 | 37.5 | — | 46 | 71 | 54 | 65 | 0.40 | 0.07 | 0.46 |
| KNV/P | 0.85 | 0.5 | 75.3 | 43.2 | — | 44 | 75 | 49 | 71 | 0.41 | 0.06 | 0.81 |
| KNV/P | 0.43 | 0.5 | 58.0 | 43.7 | — | 44 | 58 | 58 | 72 | 0.30 | 0.06 | 0.78 |
| KNV/P | 0 | 13.2 | 58.8 | 30.9 | — | 44 | 59 | 61 | 71 | 0.31 | 0.06 | 0.38 |

TABLE XI

KCl REACTION/K₂CO₃ EXTRACTION - LOW IRON CONTENT SPENT ALUMINOSILICATE CONTACT MATERIAL: FeCl₃ ADDITION

| Balance Of $Fe_2O_3$ | KNV/C (g) 0.85 g $FeCl_3$ Added | KNV/C (g) 0.43 g $FeCl_3$ Added | KNV/C (g) No $FeCl_3$ Added | KNV/P (g) 0.85 g $FeCl_3$ Added | KNV/P (g) 0.43 g $FeCl_3$ Added | KNV/P (g) No $FeCl_3$ Added |
|---|---|---|---|---|---|---|
| $Fe_2O_3$ in Sample | 0.150 | 0.150 | 0.150 | 0.108 | 0.108 | 0.108 |
| $Fe_2O_3$ added as $FeCl_3 \cdot 6H_2O$ | 0.250 | 0.126 | 0 | 0.250 | 0.126 | 0 |
| Total $Fe_2O_3$ Input | 0.400 | 0.276 | 0 | 0.358 | 0.234 | 0 |
| $Fe_2O_3$ in $H_2O$ Extract | 0.141 | 0.040 | 0.0002 | 0.152 | 0.025 | 0.0004 |
| $Fe_2O_3$ in Filter Cake | 0.201 (0.76%) | 0.216 (—)% | 0.123 (—)% | 0.216 (0.18%) | 0.205 (—)% | 0.101 (—)% |
| Total $Fe_2O_3$ Recovered | 0.342 | 0.256 | 0.123 | 0.368 | 0.230 | 0.101 |
| Apparent Loss by Volatilization | 0.058 (39%) | 0.020 (13%) | 0.027 (18%) | — (0%) | 0.004 (4%) | 0.007 (6%) |

These results demonstrate that the addition of ferric chloride to the first-stage water extraction permitted the desired separation of vanadium and nickel with no significant loss of vanadium into the nickel-containing water extract. Addition of FeCl₃, even in an amount equivalent to 1% Fe₂O₃ based upon the weight of the sample, resulted in only a comparatively small increase in the Fe₂O₃ content of the extracted contact material. The amount of FeCl₃ added to the water extraction stage in an amount equivalent to 0.5% Fe₂O₃ also provided vanadium/nickel separation.

Example 8—Potassium Chloride Reaction/Potassium Carbonate Extraction—Low Iron Content Spent Aluminosilicate Contact Material: Ferric Oxide Addition In this example, I used samples of the same low-iron Clay content spent aluminosilicate contact material and the procedure set forth in the preceding Example, except that no ferric chloride was added in the water extraction stage. Instead, I added 1% (0.25 g) or 0.5% (0.13 g) Fe₂O₃, based on weight of the sample used, to the contact material-KCl mixture before drying and heating at 1950° F. for 15 minutes. I then filtered and washed the products. The filter washes were analyzed and the results recorded in Tables XII and XIII.

TABLE XII

KCl REACTION/K₂CO₃ EXTRACTION - LOW IRON CONTENT SPENT ALUMINOSILICATE CONTACT MATERIAL: Fe₂O₃ ADDITION

| Contact Material Sample | $Fe_2O_3$ Added (g) | % Extracted In $H_2O$ V | % Extracted In $H_2O$ Ni | % Extracted In 2% $K_2CO_3$ V | % Extracted In 2% $K_2CO_3$ Ni | Total % Extracted In Filter Washes V | Total % Extracted In Filter Washes Ni | % Extracted Based on Filter Cakes V | % Extracted Based on Filter Cakes Ni | Analysis of Filter Cake (%) V | Analysis of Filter Cake (%) Ni | Analysis of Filter Cake (%) $Fe_2O_3$ |
|---|---|---|---|---|---|---|---|---|---|---|---|---|
| KNV/C | 0.25 | 0.2 | 79.8 | 39.0 | — | 39 | 80 | 50 | 75 | 0.43 | 0.05 | 0.94 |
| KNV/C | 0 | 8.2 | 71.4 | 37.5 | — | 46 | 71 | 54 | 65 | 0.40 | 0.07 | 0.46 |
| KNV/P | 0.25 | 0.1 | 65.6 | 40.8 | — | 41 | 66 | 60 | 81 | 0.32 | 0.04 | 1.01 |
| KNV/P | 0.13 | 0.9 | 62.2 | 35.5 | — | 36 | 62 | 57 | 76 | 0.34 | 0.05 | 0.76 |
| KNV/P | 0 | 13.2 | 58.8 | 30.9 | — | 44 | 59 | 61 | 71 | 0.31 | 0.06 | 0.38 |

TABLE XIII

KCl REACTION/K₂CO₃ EXTRACTION - LOW IRON CONTENT SPENT ALUMINOSILICATE CONTACT MATERIAL: Fe₂O₃ ADDITION

| Balance Of $Fe_2O_3$ | KNV/C (g) 0.25 g $Fe_2O_3$ Added | KNV/C (g) No $Fe_2O_3$ Added | KNV/P (g) 0.25 g $Fe_2O_3$ Added | KNV/P (g) 0.13 g $Fe_2O_3$ Added | KNV/P (g) No $Fe_2O_3$ Added |
|---|---|---|---|---|---|
| $Fe_2O_3$ in Sample | 0.150 | 0.150 | 0.108 | 0.108 | 0.108 |
| $Fe_2O_3$ Added | 0.250 | 0 | 0.250 | 0.130 | 0 |
| Total $Fe_2O_3$ Input | 0.400 | 0 | 0.358 | 0.238 | 0 |
| $Fe_2O_3$ in $H_2O$ Extract | 0.052 | 0.002 | 0.024 | <0.0001 | 0.0004 |
| $Fe_2O_3$ in Filter Cake | 0.252 (0.94%) | 0.123 (—%) | 0.269 (1.01%) | 0.205 (—%) | 0.101 (—%) |
| Total $Fe_2O_3$ Recovered | 0.304 | 0.123 | 0.293 | 0.205 | 0.101 |
| Apparent Loss by Volatilization | 0.096 (24%) | 0.027 (18%) | 0.065 (18%) | 0.033 (14%) | 0.007 (6%) |

These results illustrate that the addition of 1% Fe₂O₃ to the spent contact material-KCl reaction mixture provided virtually complete segregation of vanadium and nickel with no significant loss of vanadium into the nickel-containing water extract. Fe₂O₃ addition in an amount equivalent to 0.5% of the sample weight still provided good separation between nickel and vanadium.

Example 9—Potassium Chloride+Lithium Chloride Reaction/Potassium Carbonate Extraction—Low Iron Content Spent Aluminosilicate Contact Material: FeCl₃ or Fe₂O₃ Addition In this example, I reacted 25 g samples of spent aluminosilicate contact material KNV/P, with 20 g of 25% KCl, and 20 g of 25% LiCl; with the addition of varying amounts of Fe₂O₃ at 1900° F. for 15 minutes. I extracted the products with 40 ml of water at 50°–60° C. for 30 minutes. I extracted the resulting product with 50 ml of 2% K₂CO₃ at reflux for 30 minutes and filtered and washed the product.

I carried out similar experiments with and without the addition of FeCl₃·6H₂O to the water used for extraction of nickel, in place of addition of $Fe_2O_3$ to the admixture of contact material and alkali chloride prior to the thermal treatment. Results of analysis of the filter washes and filter cakes are shown in Tables XIV and XV.

$Fe_2O_3$) with mixtures of 25% KCl and a 25% LiCl solutions, in a proportion such that the contact material:KCl:LiCl ratio, by weight, was 100:24.4:20. I dried the resulting mixtures at 220° C. for 1 hour and heated them for 15 minutes at 1850° F. The products were then

TABLE XIV

KCl/LiCl REACTION/$K_2CO_3$ EXTRACTION - LOW IRON CONTENT
SPENT ALUMINOSILICATE CONTACT MATERIAL: $Fe_2O_3$ OR $FeCl_3$ ADDITION

| Contact Material Sample (KNV/P) | $Fe_2O_3$ Added to KCl/LiCl Reaction (g) (% of KNV/P) | | $FeCl_3 \cdot 6H_2O$ Added to $H_2O$ Extraction (g) ($Fe_2O_3$ % of KNV/P) | | % Extracted | | | | Total % Extracted in Filter Washes | | % Extracted Based on Filter Cakes | | Analysis of Filter Cakes (%) | | |
|---|---|---|---|---|---|---|---|---|---|---|---|---|---|---|---|
| | | | | | In $H_2O$ | | In 2% $K_2CO_3$ | | | | | | | | |
| | | | | | V | Ni | V | Ni | V | Ni | V | Ni | V | Ni | $Fe_2O_3$ |
| 1 | — | — | — | — | 18.2 | 65.1 | 17.0 | — | 35 | 65 | 58 | 86 | 0.34 | 0.03 | 0.33 |
| 2 | — | — | 0.43 | 0.5 | 0.2 | 72.5 | 34.6 | — | 35 | 73 | 59 | 90 | 0.33 | 0.02 | 0.76 |
| 3 | — | — | 0.21 | 0.25 | 1.7 | 69.6 | 31.5 | — | 33 | 70 | 59 | 90 | 0.33 | 0.02 | 0.51 |
| 4 | 0.13 | 0.5 | — | — | 12.0 | 74.9 | 25.2 | — | 37 | 75 | 63 | 90 | 0.30 | 0.02 | 0.59 |
| 5 | 0.06 | 0.25 | — | — | 10.5 | 73.3 | 23.3 | — | 34 | 73 | 60 | 90 | 0.32 | 0.02 | 0.45 |

TABLE XV

KCl/LiCl REACTION/$K_2CO_3$ EXTRACTION - LOW IRON CONTENT
SPENT ALUMINOSILICATE CONTACT MATERIAL: $Fe_2O_3$ OR $FeCl_3$ ADDITION

| Balance Of $Fe_2O_3$ | KNV/P CONTACT MATERIAL SAMPLE (g) | | | | |
|---|---|---|---|---|---|
| | 1 | 2 | 3 | 4 | 5 |
| $Fe_2O_3$ in Sample | 0.108 | 0.108 | 0.108 | 0.108 | 0.108 |
| $Fe_2O_3$ Added | — | — | — | 0.130 | 0.060 |
| $Fe_2O_3$ Added as $FeCl_3 \cdot 6H_2O$ | — | 0.125 | 0.063 | — | — |
| Total $Fe_2O_3$ Input | 0.108 | 0.233 | 0.171 | 0.238 | 0.168 |
| $Fe_2O_3$ in $H_2O$ Extract | 0.0001 | 0.013 | 0.0003 | 0.0001 | 0.0002 |
| $Fe_2O_3$ in Filter Cake | 0.0867 | 0.201 | 0.134 | 0.155 | 0.119 |
| Total $Fe_2O_3$ Recovered | 0.087 | 0.214 | 0.134 | 0.155 | 0.119 |
| Apparent Loss by Volatilization | 0.021 (19%) | 0.109 (18%) | 0.037 (34%) | 0.083 (35%) | 0.049 (29%) |

These results demonstrate that addition of ferric chloride (in an equivalent to 0.5% $Fe_2O_3$ on the sample) to the water extraction ensured vanadium and nickel separation. When 1% $Fe_2O_3$ was added to the KCl/LiCl reaction before heating, the KCl/LiCl ratio in the mixture was preferably 1.6:1.

Example 10—Potassium Chloride + Lithium Chloride Reaction/Hydrochloric Acid Extraction I contacted 25 g samples of KNV/H spent aluminosilicate contact material (1.34% V, 0.36% Ni, 1.55% $Fe_2O_3$) with mixtures of 25% KCl and a 25% LiCl solutions, in a proportion such that the contact material:KCl:LiCl ratio, by weight, was 100:24.4:20. I dried the resulting mixtures at 220° C. for 1 hour and heated them for 15 minutes at 1850° F. The products were then extracted by refluxing at boiling with various amounts of 1:1 HCl (20%) for various reaction times then filtered and washed. The results are shown in Table XVI.

I found that vanadium and nickel extractions were generally independent of the amount of 1:1 HCl used and extraction time. Co-extraction of alumina increased at the longer reaction times of 120 and 180 minutes but remained at acceptable levels.

TABLE XVI

KCl/LiCl REACTION/HCl EXTRACTION

| Amount HCl/$H_2O$ Extractant (ml) | Extraction Time (min) | Total Extracted In Filter Washes (%) | | | % Extracted Based on Filter Cake | | Final Filter Cake Analysis (%) | | | |
|---|---|---|---|---|---|---|---|---|---|---|
| | | V | Ni | $Al_2O_3$ | V | Ni | V | Ni | $Li_2O$ | $K_2O$ |
| 50/50 | 15 | 75 | 79 | 3.5 | 75 | 78 | 0.44 | 0.08 | 1.17 | 1.40 |
| 50/50 | 60 | 72 | 83 | 3.6 | 72 | 78 | 0.45 | 0.08 | 0.72 | 1.31 |
| 50/50 | 120 | 67 | 79 | 5.7 | 67 | 81 | 0.45 | 0.07 | 0.42 | 1.46 |
| 50/50 | 180 | 70 | 78 | 7.9 | 70 | 78 | 0.42 | 0.08 | N/A | 1.42 |
| 20/20 | 15 | 69 | 78 | 1.2 | 69 | 78 | 0.44 | 0.08 | 0.98 | 1.51 |
| 20/20 | 120 | 70 | 81 | 5.1 | 70 | 81 | 0.41 | 0.07 | 0.56 | 1.48 |
| 10/10 | 15 | 69 | 78 | 1.9 | 69 | 78 | 0.47 | 0.08 | 1.01 | 1.17 |
| 10/10 | 60 | 69 | 78 | 2.3 | 69 | 78 | 0.46 | 0.08 | 0.73 | 1.32 |
| 10/10 | 180 | 65 | 86 | 6.0 | 65 | 78 | 0.44 | 0.08 | 0.55 | 1.42 |

Example 11—Potassium Chloride Reaction/Hydrochloric Acid Extraction

I contacted 25 g samples of KNV/H spent aluminosilicate contact material (1.34% V, 0.36% Ni, 1.55% $Fe_2O_3$) with 2% g or 32 g 25% KCl, dried the resulting mixtures at 220° C. and heated them for 15 minutes at 1900° F. The products were then extracted by refluxing at boiling with various amounts of 1:1 HCl (20%) for various times and then filtered and washed. The results are shown in Table XVII.

I found that vanadium and nickel extractions were substantially independent of the amount of 1:1 HCl used and the extraction time. Alumina extraction increased, to levels which remained acceptable, with longer extraction times. Reactions carried out using a higher KCl:KNV/H ratio showed increased extraction of nickel and vanadium.

TABLE XVII

KCl REACTION/HCl EXTRACTION

| KCl % of KNV/H | Amount HCl/H$_2$O Extractant (ml) | Extraction Time (min) | Total (%) Extracted In Filter Washes | | | % Extracted Based on Filter Cake | | Final Filter Cake Analysis (%) | | |
|---|---|---|---|---|---|---|---|---|---|---|
| | | | V | Ni | Al$_2$O$_3$ | V | Ni | V | Ni | K$_2$O |
| 24 | 50/50 | 15 | 57 | 62 | 4.5 | 55 | 64 | 0.60 | 0.13 | 2.50 |
| 24 | 50/50 | 60 | 48 | 49 | 4.7 | 58 | 64 | 0.56 | 0.13 | 2.18 |
| 24 | 50/50 | 120 | 61 | 60 | 7.8 | 60 | 64 | 0.53 | 0.13 | 2.05 |
| 24 | 50/50 | 15 | 56 | 58 | 5.1 | 57 | 61 | 0.58 | 0.14 | 2.37 |
| 24 | 50/50 | 180 | 60 | 58 | 8.0 | 60 | 61 | 0.53 | 0.14 | 2.07 |
| 24 | 50/50 | 15 | 54 | 57 | 5.0 | 58 | 64 | 0.56 | 0.13 | 2.43 |
| 24 | 50/50 | 180 | 62 | 63 | 9.6 | 60 | 64 | 0.53 | 0.13 | 2.01 |
| 32 | 25/25 | 60 | 58 | 67 | — | 65 | 75 | 0.47 | 0.09 | 2.71 |

Example 12—Lithium Chloride Reaction/Hydrochloric Acid Extraction

I contacted 25 g samples of KNV/H spent aluminosilicate contact material with 20, 25 or 30 g of 25% KCl, dried the resulting mixtures at 220° C. and heated them at 1850° F. for 15 minutes. The products were extracted by refluxing at boiling with various amounts of 1:1 HCl (20%) for various times. I then filtered and washed the products. The results are shown in Table XVIII.

I found that increasing the LiCl:KNV/H ratio from 20 g:25 g to 25 g:25 g increased metals extraction. As the LiCl:KNV/H ratio became higher e.g., 30 g:25 g, metals extraction did not increase.

TABLE XVIII

LiCl REACTION/HCl EXTRACTION

| LiCl % of KNV/H | Amount HCl/H$_2$O Extractant (ml) | Extraction Time (min) | Total (%) Extracted In Filter Washes | | | % Extracted Based on Filter Cake | | Final Filter Cake Analysis (%) | | |
|---|---|---|---|---|---|---|---|---|---|---|
| | | | V | Ni | Al$_2$O$_3$ | V | Ni | V | Ni | Li$_2$O |
| 20 | 50/50 | 15 | 69 | 59 | 7.0 | 72 | 75 | 0.37 | 0.09 | 1.88 |
| 20 | 25/25 | 60 | 68 | 61 | — | 81 | 83 | 0.26 | 0.06 | 1.40 |
| 20 | 10/10 | 180 | 59 | 60 | 9.0 | 67 | 81 | 0.44 | 0.07 | 0.86 |
| 25 | 20/20 | 60 | 72 | 76 | 6.2 | 78 | 83 | 0.30 | 0.06 | 1.26 |
| 30 | 20/20 | 60 | 76 | 74 | 7.9 | 78 | 83 | 0.30 | 0.06 | 0.99 |

Example 13—Alkali Chloride Reaction/Sulfuric Acid Extraction

I contacted samples of KNV/K spent aluminosilicate contact material with an equal weight of 25% LiCl solution, dried the resulting mixtures at 220° C. and heated them at 1850° F. for 15 minutes. The products were extracted by stirring with water at 50°-60° C. for 30 minutes (solids/liquid ratio 1:1.6) with addition of HCl to reduce the pH to 1.0. The solids were filtered off, washed, dried and analyzed. 25 g samples were reacted with 20 ml of sulfuric acid of various concentrations by boiling under reflux for 1 hour. The reaction products were filtered and washed and the dried residual solids were analyzed to determine overall extraction levels of vanadium and nickel and losses of lithium into the extracted contact material. The results are shown in Table XIX.

I found that extractions of vanadium and nickel were independent of sulfuric acid concentration in the range 45 to 70% but that co-extraction of alumina increased with increasing acid concentration; lithium losses were reduced by increasing acid concentration.

TABLE XIX

LiCl REACTION/H$_2$O AND/H$_2$SO$_4$ EXTRACTION

| Analysis of Solids after H$_2$O Extraction (%) | | | H$_2$SO$_4$ Concentration (%) | % Extracted Based on Final Filter Cake | | Li$_2$O Content of Final Filter Cake (%) | Al$_2$O$_3$ Extracted (%) | Weight Loss (%) |
|---|---|---|---|---|---|---|---|---|
| V | Ni | Li$_2$O | | V | Ni | | | |
| 1.30 | 0.17 | 3.90 | 45 | 85 | 83 | 1.40 | 6 | 5 |
| 1.30 | 0.17 | 3.90 | 50 | 86 | 83 | 0.65 | 10 | 8 |
| 1.09 | 0.13 | 4.00 | 60 | 80 | 83 | 0.60 | 12 | 12 |
| 1.09 | 0.13 | 4.00 | 70 | 83 | 85 | 0.11 | 24 | 14 |

Example 14—Potassium Chloride Reaction/Sulfuric Acid Extraction

I contacted 25 g samples of KNV/M spent aluminosilicate contact material (1.79% V, 0.39% N, 2.36% Fe$_2$O$_3$) with 32 g of 25% KCl solution, dried the resulting mixtures at 220° C. and heated them for 15 minutes at a series of temperatures. Samples A, B and C were extracted with water at 50°-60° C. for 30 minutes (solids/liquid ratio 1:1.6), filtered and washed. The filter cakes were then extracted with 20 ml 50% H$_2$SO$_4$ under reflux for 1 hour. The residual solids were separated by filtration, washed, dried and analyzed to determine overall extraction of vanadium and nickel. In the case of samples D, E and F, only a single extraction was carried out using 20 ml 50% H$_2$SO$_4$, with no prior water extraction. The results are shown in Table XX.

I found that vanadium extractions were substantially independent of reaction temperature in the range of 1850° to 1950° F. but that good extraction of nickel required a temperature of 1900° to 1950° F. With reaction temperatures of 1900°/1950° F., average extractions were: V: 65%, Ni: 65%.

TABLE XX

KCl REACTION/H₂SO₄ EXTRACTION

| Sample | Reaction Temp (°F.) | Total % Extracted V | Ni | Al₂O₃ | Weight Loss (%) |
|---|---|---|---|---|---|
| A | 1850 | 63 | 50 | 9 | 3 |
| B | 1900 | 68 | 69 | 16 | 6 |
| C | 1950 | 63 | 65 | 9 | 3 |
| D | 1850 | 62 | 53 | 7 | 4 |
| E | 1900 | 65 | 61 | 9 | 4 |
| F | 1950 | 63 | 63 | 6 | 3 |

Having described the invention with particular reference to the preferred form thereof, it will be apparent to those skilled in the art to which the invention pertains, after understanding the invention, that various changes and modifications may be made therein without departing from the spirit and scope of the invention as defined by the claims appended hereto.

As my invention, I claim:

1. A process for removing nickel and vanadium values from aluminosilicate materials contaminated therewith comprising the steps of:
   (a) contacting an aluminosilicate material that contains nickel and vanadium values with an alkali chloride selected from the group consisting of potassium chloride, lithium chloride and mixtures of potassium chloride and lithium chloride, in the substantial absence of moisture, at a temperature above the melting point of the chloride or chlorides, under conditions effective to convert at least a major portion of the nickel in the aluminosilicate material to a water soluble form; and
   (b) subsequently removing the nickel and vanadium values from the aluminosilicate material, the nickel values being removed by contacting said material with aqueous liquid.

2. The process according to claim 1, wherein the nickel values are removed from the aluminosilicate material obtained in step (a) by contacting the material with water to obtain an aqueous extract of nickel chloride.

3. The process according to claim 1, wherein the nickel values are removed from the aluminosilicate material in step (b) without appreciable co-extraction of alumina or silica from that material.

4. The process according to claim 2, wherein the aqueous extract of nickel chloride comprises ferric chloride in an amount of at least about 50 ppm by weight (calculated as Fe₂O₃).

5. The process according to claim 2, further comprising the step of recovering the nickel values from the aqueous extract of nickel chloride.

6. The process according to claim 5, wherein the aqueous extract of nickel chloride is acidic and the nickel values are recovered by neutralizing the aqueous extract of nickel chloride to precipitate nickel in the form of nickel oxide, hydrous nickel oxide, nickel hydroxide or nickel carbonate.

7. The process according to claim 5, wherein the nickel values are recovered from the aqueous extract of nickel chloride by liquid ion exchange or by electrolysis.

8. The process according to claim 1, wherein in step (a) the aluminosilicate material is contacted with a mixture of potassium chloride and lithium chloride in which the weight ratio of KCl to LiCl is between about 1:1 and 2:1 and wherein the total weight of the chlorides is at least about 10% of the weight of the contact material.

9. The process according to claim 1, wherein step (a) is conducted at a temperature between about 1450° and 2200° F. for a period between about 5 and 60 minutes.

10. The process according to claim 9, wherein step (a) is conducted at a temperature between about 1750° and 1950° F. and for a period between about 10 and 30 minutes.

11. The process according to claim 2, further comprising the steps of separating the aluminosilicate material from the aqueous extract of nickel chloride and, thereafter, treating the separated aluminosilicate material to remove the vanadium values.

12. The process according to claim 11, wherein the vanadium values are removed from the aluminosilicate material by contacting the material with an aqueous solution of an alkali to obtain an aqueous extract comprising vanadium values.

13. The process according to claim 12, wherein the aqueous solution of an alkali comprises an alkali carbonate selected from the group consisting of potassium carbonate and sodium carbonate.

14. The process according to claim 12, wherein the aqueous solution of an alkali comprises by weight between about 1.5% and 2.5% potassium carbonate.

15. The process according to claim 11, wherein the vanadium values are removed from the aluminosilicate material by contacting the material with an aqueous solution including alkali carbonate to obtain an aqueous extract comprising vanadium values.

16. The process according to claim 11, wherein the vanadium values are removed from the aluminosilicate material by contacting the material with an admixture of an alkali acetate and an alkali carbonate at a temperature above the melting point of the alkali acetate.

17. The process according to claim 11, wherein the vanadium values are removed from the aluminosilicate material by contacting the material with an admixture of an alkali acetate and an alkali hydroxide at a temperature above the melting point of the alkali acetate.

18. The process according to claim 11, wherein the vanadium values are removed from the aluminosilicate material by contacting the material with an aqueous acid solution of hydrochloric acid, sulfuric acid, or mixtures thereof.

19. The process according to claim 18, wherein the acid solution comprises by weight between about 10% and 36% hydrochloric acid.

20. The process according to claim 18, wherein the acid solution comprises by weight between about 40% and 70% sulfuric acid.

21. The process according to claim 12, further comprising the step of recovering the vanadium values from the extract by liquid ion exchange.

22. The process according to claim 21, wherein the liquid ion exchange step comprises contacting the extract with an organic phase comprising a quaternary amine in the carbonate or chloride form to exchange the vanadium values, in the form of vanadate ions, from the extract into the organic phase.

23. The process according to claim 22, further comprising the step of stripping the organic phase including the vanadate ions with an aqueous ammoniacal stripping solution to obtain ammonium metavanadate.

24. The process according to claim 23, wherein the aqueous stripping solution comprises ammonium carbonate and at least one ammonium salt other than ammonium carbonate.

25. The process according to claim 24, wherein the ammonium salt is ammonium sulfate.

26. The process according to claim 23, wherein the aqueous stripping solution comprises ammonium hydroxide and ammonium chloride.

27. The process according to claim 25, further comprising the step of treating the aqueous phase remaining after the liquid ion exchange step with barium carbonate.

28. The process according to claim 1, wherein the aluminosilicate material that contains nickel and vanadium values comprises a particulate contact material that was contacted with a petroleum feedstock in a selective vaporization process.

29. The process according to claim 1, wherein the aluminosilicate material that contains nickel and vanadium values comprises a particulate contact material that was contacted with a petroleum feedstock in a selective vaporization process and further wherein after step (b) at least a portion of the resulting aluminosilicate material is contacted with a petroleum feedstock in a selective vaporization process.

30. A process for removing nickel and vanadium values from aluminosilicate materials comprising the steps of:
  (a) contacting an aluminosilicate material with an alkali chloride selected from the group consisting of potassium chloride, lithium chloride, and mixtures thereof, in the substantial absence of moisture, at a temperature above the melting point of the chloride or chlorides, under conditions effective to convert the nickel in the aluminosilicate material to an acid soluble form; and
  (b) removing the nickel and vanadium values from the aluminosilicate material.

31. The process according to claim 30, wherein step (a) is conducted at a temperature between about 1750° and 2200° F. for a period of between about 5 and 60 minutes.

32. The process according to claim 31, wherein step (a) is conducted at a temperature between about 1750° and 1950° F. for a period of between about 10 and 30 minutes.

33. The process according to claim 30, wherein the nickel and vanadium values are removed from the aluminosilicate material obtained in step (a) by contacting the material with an aqueous solution of hydrochloric acid, sulfuric acid, or mixtures thereof, to extract the nickel and vanadium values from the aluminosilicate material into the liquid phase.

34. The process according to claim 33, wherein the aluminosilicate material obtained in step (a) is contacted with the aqueous solution of hydrochloric acid, sulfuric acid, or mixtures thereof for a period of between about 30 minutes and 3 hours.

35. The process according to claim 33, wherein the aluminosilicate material obtained in step (a) is contacted with an aqueous solution comprising between about 10% and 36% by weight of hydrochloric acid at or near the boiling point of said aqueous solution for a period of between about 30 minutes and 3 hours.

36. The process according to claim 33, wherein the aluminosilicate material obtained in step (a) is contacted with an aqueous solution comprising from about 40% to 70% by weight of sulfuric acid at or near the boiling point of said aqueous solution for a period of at least about 30 minutes.

37. The process according to claim 33, further comprising the step of treating the liquid phase to recover the vanadium and nickel values therefrom.

38. The process according to claim 37, wherein the vanadium values are recovered by liquid ion exchange.

39. The process according to claim 30, wherein the aluminosilicate material that contains nickel and vanadium comprises a particulate contact material that was contacted with a petroleum feedstock.

40. The process according to claim 30, wherein the aluminosilicate material that contains nickle and vanadium comprises a particulate contact material that was contacted with a petroleum feedstock in a selective vaporization process and further wherein after step (b), at least a portion of the resulting aluminosilicate material is contacted with a petroleum feedstock in a selective vaporization process.

* * * * *